(12) United States Patent
Wu

(10) Patent No.: US 6,487,029 B1
(45) Date of Patent: *Nov. 26, 2002

(54) HARD DRIVE WITH FORMAT CALCULATOR FOR GENERATING SECTOR NUMBERS ON TRACK

(75) Inventor: Joanne C. Wu, Diamond Bar, CA (US)

(73) Assignee: Adaptec, Inc., Milpitas, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 09/602,563

(22) Filed: Jun. 22, 2000

(51) Int. Cl.$^7$ ................................. G11B 5/02
(52) U.S. Cl. .......................... 360/27; 360/31
(58) Field of Search ................. 360/27, 31, 72.2

(56) References Cited

U.S. PATENT DOCUMENTS

| | | | |
|---|---|---|---|
| 5,615,190 A | 3/1997 | Best et al. | 369/53.41 |
| 5,715,106 A | 2/1998 | Kool et al. | 360/48 |
| 5,959,795 A | * 9/1999 | Wu | 360/27 |
| 6,049,436 A | * 4/2000 | Wu | 360/27 |

* cited by examiner

*Primary Examiner*—David L. Robertson
(74) *Attorney, Agent, or Firm*—Martine & Penilla, LLP

(57) ABSTRACT

Disclosed is a headerless hard drive system that includes a head-disk assembly, a servo control logic, and a format calculator. The head-disk assembly includes a set of recordable disks for storing data. Each recordable disk having a plurality of tracks with each track having a plurality of servo wedges for dividing the track into a plurality of data frames. In this arrangement, one data frame is associated with one servo wedge and the tracks do not contain any header information that uniquely identifies the data frames in the tracks. The servo control logic coupled to the head-disk assembly to process the servo wedges for generating a signal that identifies a servo wedge being processed on a track. The format calculator is configured to convert the signal that identifies the servo wedge being processed to an associated sector number on the track. In addition, the format calculator is adapted to compute a set of parameters including ending and beginning split sector sizes and the number of whole sectors in the data frame associated with the servo wedge being processed.

21 Claims, 5 Drawing Sheets

HARD DRIVE WITH FORMAT CALCULATOR FOR GENERATING SECTOR NUMBERS ON TRACK

BACKGROUND OF THE INVENTION

1. Field of the Invention

This invention relates generally to magnetic storage media, and more particularly to hard disk drive systems that do not provide unique identifying headers on tracks.

2. Description of the Related Art

Conventional hard disk drives typically include one or more magnetic media disks with surfaces divided into concentric tracks for storing data. FIG. 1 shows an exemplary hard disk 100 for storing data in a plurality of tracks 106, 108, 110, 112, 114, and 116. The tracks 106, 108, 110, 112, 114, and 116 may be arranged to define a plurality of data zones. In the hard disk 100, a plurality of servo wedges 104 is spaced about the disk in a spoke-like pattern. The servo wedges 104 subdivide the tracks into a plurality of data frames 102. The portion of a servo wedge 104 within a track is commonly referred to as a servo sector, which separates one data frame in the track from another. Typically, a servo sequencer uses the servo sectors in a track to keep a data head to follow the track and generates end-of-servo (EOS) pulses that mark the ends of servo sectors and the beginnings of data frames. In addition to track following information, a servo sector often contains an ID field that identifies the servo sector and an associated data frame.

In the hard disk 100, data is stored in the data frames, which are typically organized into data sectors, each of which contains the same amount of data such as 512 bytes. The data sectors may include a single data segment that is entirely within a data frame or multiple data segments that are separated from each other by, for example, a servo sector. For constant density recording, the disk area per data byte is constant. However, the amount of data that fits within a data frame varies because the available area depends on the circumferences of the track containing the data frame. Hence, the locations of boundaries of data sectors depend on the track.

When reading or writing a data sector, the boundaries of each data segment need to be identified. One method for identifying data sector boundaries uses information from a header of a data sector to locate splits in the data sector. However, split information stored in headers wastes disk space that could otherwise be used to store data.

Headerless data sectors lack headers containing split information, thereby leaving more disk area for data storage. However, a disk sequencer still requires split information to locate the boundaries of data sectors and segments. A hard disk can store such split information in non-volatile memory, on disk in data sectors, or in a data buffer memory. The split information typically takes the form of look-up tables that describe track formats. For example, a hard disk would typically require one look-up table per zone of tracks having a common track format. Each table contains format words associated with particular data frames, data sectors, or data segments. If, for example, a hard disk having 20 different zones of tracks and 64 embedded servo wedges requires an average of three words of split information per data frame, the hard disk requires 20 look-up tables and a total of 3,840 words of split information.

To avoid degrading performance, a hard disk commonly requires additional data buffer capacity, bandwidth, and processing power for handling the split information. If the required bandwidth is not available when required to transfer split information to a disk sequencer, the hard disk may miss a data sector and delay a transfer for a revolution of the disk. Additionally, firmware executed by a processor in the disk drive must identify the table and split information that corresponds to the current position of the data heads relative to a track being followed. The calculations required to identify the split information can be complex and consume processing power that could otherwise be used for other purposes such as controlling a servo sequencer, managing a data buffer, handling a host interface, and converting read/write requests to a list of physical data sector to be accessed.

Thus, what is needed is a hard drive system that can reduce the amount of split information and reduce the processing demands on a processor in the hard disk drive.

SUMMARY OF THE INVENTION

Broadly speaking, the present invention fills these needs by providing a format calculator for headerless hard drive systems for generating sector numbers on track. It should be appreciated that the present invention can be implemented in numerous ways, including as a process, an apparatus, a system, computer readable media, or a device. Several inventive embodiments of the present invention are described below.

In one embodiment, the present invention provides a headerless hard disk drive system that includes a head-disk assembly, a servo control logic, and a format calculator. The head-disk assembly includes a set of recordable disks for storing data. Each recordable disk having a plurality of tracks with each track having a plurality of servo wedges for dividing the track into a plurality of data frames. In this arrangement, one data frame is associated with one servo wedge and the tracks do not contain any header information that uniquely identifies the data frames in the tracks. The servo control logic coupled to the head-disk assembly to process the servo wedges for generating a signal that identifies a servo wedge being processed on a track. The format calculator is configured to convert the signal that identifies the servo wedge being processed to an associated sector number on the track. In addition, the format calculator is adapted to compute a set of parameters including ending and beginning split sector sizes and the number of whole sectors in the data frame associated with the servo wedge being processed.

In another embodiment, the present invention provides a hard drive system. The hard drive system includes a head-disk assembly, a servo control logic, and a format calculator. The head-disk assembly includes a set of hard disks for storing data with each hard disk having a plurality of tracks. Each track has a plurality of servo wedges for dividing the track into a plurality of data frames with one data frame being associated with one servo wedge. The tracks in the hard disks do not contain any header information that uniquely identifies the data frames in the tracks. The servo control logic is coupled to the head-disk assembly to process the servo wedges for generating a signal that identifies a servo wedge being processed in a track. The format calculator is adapted to convert the servo wedge identifying signal to an associated sector number that corresponds to the servo wedge being processed in the track. The format calculator is further adapted to compute a set of parameters including ending and beginning split sector sizes and the number of whole sectors in the data frame associated with the servo wedge being processed.

Advantageously, the format calculator automatically converts servo frame numbers to the associated sector number on track on-the-fly. This reduces processor bandwidth consumption and also supports zero latency read/write operations in hard drive systems. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

DETAILED DESCRIPTION OF THE PREFERRED EMBODIMENTS

The present invention provides a headerless hard drive system for generating sector numbers on track. It will be obvious, however, to one skilled in the art, that the present invention may be practiced without some or all of these specific details. In other instances, well known process operations have not been described in detail in order not to unnecessarily obscure the present invention.

Figure 1:
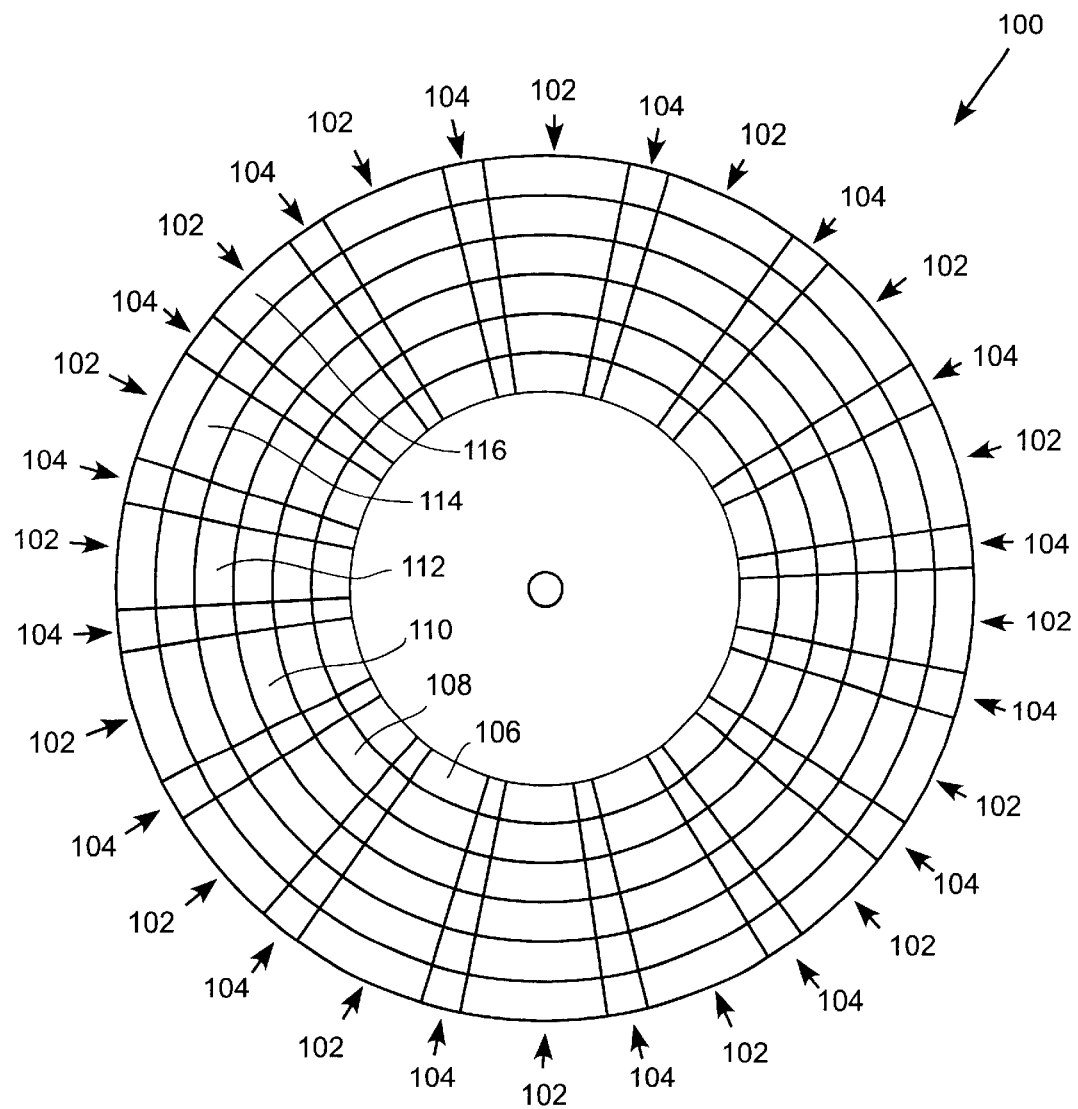
FIG. 1 is a schematic block diagram of a conventional hard disk for storing data.
Figure 2:
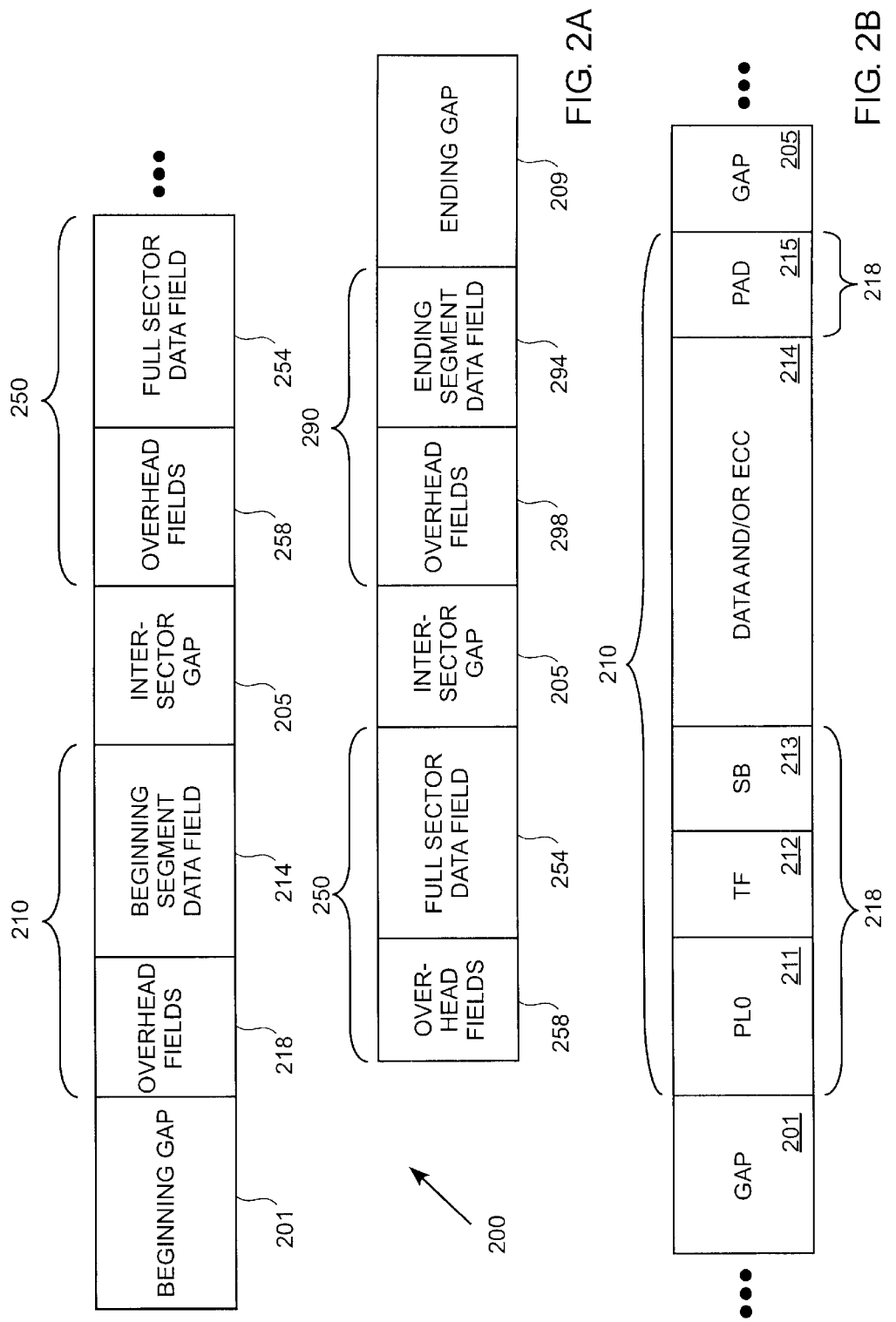
FIGS. 2A and 2B illustrate formats for a data frame and a data segment with a data frame.

FIGS. 2A and 2B illustrate formats for a data frame and a data segment with a data frame. In FIG. 2A, data frame 200 contains one or more data segments where each data segment 210, 250, or 290 includes a data field 214, 254, or 294 and overhead fields 218, 258, or 298. At the beginning and end of data frame 200 are a beginning gap 201 and an ending gap 209. Between data sectors are inter-sector gaps 205 that provide a margin to avoid overwriting the beginning of one data segment at the end of a previous data segment.

Data frame 200 includes beginning gap 201 following a servo sector, beginning data segment 210, and ending gap 209 preceding the next servo sector. Beginning data segment 210 may be either a full data sector or a partial data sector. Additional data segments such as data segment 290 or 250 are present if data frame 200 contains two or more data segments. For two or more data segments, data frame 200 includes beginning sector 210 and ending segment 290, either of which can be a full data sector or a partial data sector. For more than two data segments, data frame 200 further contains one or more copies of data segment 250 between beginning data segment 210 and ending data segment 290. Each segment 250 is a full data sector in the exemplary format.

FIG. 2B shows a possible format for data segment 210 and surrounding gaps 201, 205, or 209. The beginning gap 201, inter-sector gap 205, and ending gap 209 provide tolerances for fluctuation in timing of EOS pulses. Beginning gap 201 covers disk area that is unusable because of variations in the time required to generate, detect, and act upon end-of-servo (EOS) pulses. A number of byte clock cycles is assigned to gap 201 to ensure that writing of a data segment does not begin until after the data heads have passed a servo sector. In addition, a different number of byte clock cycles may be assigned to gap 201 for reading to ensure that a read head has reached the first of the overhead fields. Overhead fields 218 include a phase lock (PLO) field 211, a training field 212, a byte synchronization field 213, and a pad field 215. As shown, overhead fields 218 can precede or follow data field 214. In general, the sizes of the overhead fields for all data segments in a track or across the entire drive are usually fixed.

PLO field 211 is for matching the frequency of signal BYTECLK to the byte rate during a read operation. When a data head reads PLO field 211, a phase-locked loop locks the frequency of clock signal BYTECLK to the frequency of a pulse train in signal NRZ generated from PLO field 211. Sync byte field 213 is for byte alignment of data field 214. Typically, bytes in PLO field 211 have a value of zero while sync byte field 213 contains one or more non-zero bytes. Some sync detection circuits require training field 212 between PLO field 211 and sync byte field 213. The training field 212, however, may be omitted in embodiments where sync detection circuits are not provided. Similarly, optional pad bytes 215 provide a cushion of unused disk area.

Data field 214 contains storage locations for data and/or error correction code (ECC) bytes. The size of data field 214 depends on whether data segment 210 is a full data sector or a partial data sector. A data segment that is a full data sector has the maximum size data field and accommodates all of the data and ECC bytes in a data sector. A data segment that is a partial data sector contains a smaller data field because the data and ECC bytes for a data sector is partitioned between two partial data sectors.

The track format may provide any suitable number of bytes. By way of example, PLO field 211 includes 12 bytes written with a constant value (e.g., zero) while training field 212 is an unambiguous 8-byte pattern that is used to prepare sync detection circuits for decoding a 3-byte sync field 213. Data field 214 has a maximum size BPS of 548 bytes, which include 512 data bytes and 36 bytes of ECC data. Pad field 215 has a size equal to 10 bytes.

Figure 3:
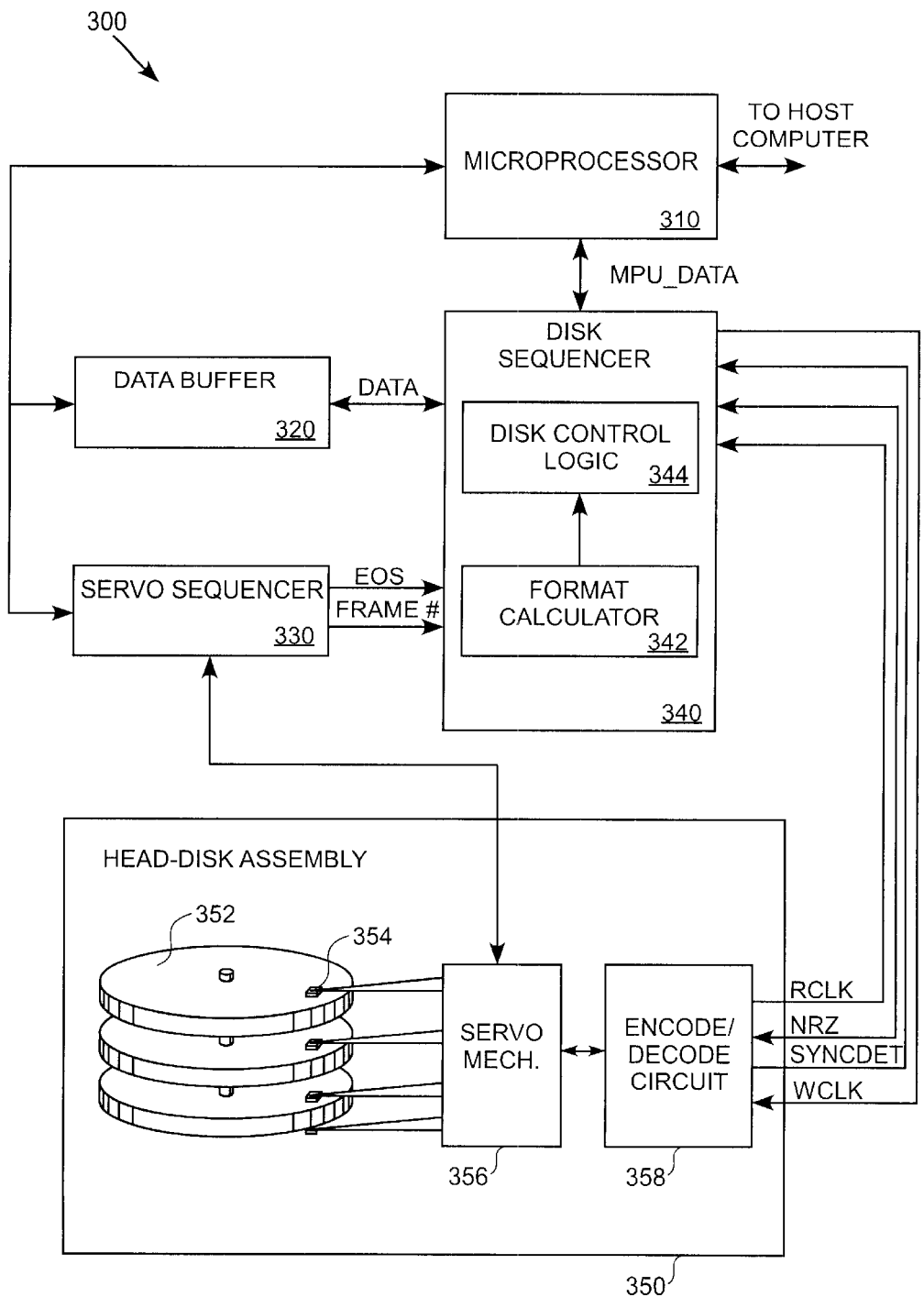
FIG. 3 shows a block diagram of a hard disk drive in accordance with one embodiment of the present invention.

FIG. 3 shows a block diagram of a hard disk drive 300 having a headerless architecture and embedded servo sectors in accordance with one embodiment of the present invention. The hard disk drive 300 includes a microprocessor 310, a data buffer 320, a servo sequencer 330, a disk sequencer 340, and a head-disk assembly 350. The microprocessor 310 executes firmware to control disk sequencer 340, which controls data transfer between data buffer 320 and the head-disk assembly 350. Upon start-up, the hard disk drive 300 initializes the disk sequencer 340 with values for counts PLOCNT, TFCNT, SBCNT, BPS, and PADCNT, which indicate the lengths of PLO field 211, training field 212, sync bytes 213, a data field 254 for a full sector, and pad field 215, respectively. A count OVH is a total byte count for the overhead fields in each segment and is the sum of counts PLOCNT, TFCNT, SBCNT, and PADCNT.

The head-disk assembly 350 contains magnetic media disks 352 formatted for headerless data sectors, a servo mechanism 356 that radially positions data heads 354 relative to disks 352, and an encode/decode circuit 358. The encode/decode circuit 358 converts data signal NRZ and a write clock signal WCLK from disk sequencer 340 to write signals for data heads 354. In addition, the encode/decode circuit 358 converts signals generated by data heads 354 to data signal NRZ and a read clock RCLK for input to disk sequencer 340. The encode/decode circuit 358 may also generate a signal SYNCDET from data sync fields that data heads 354 encounter on the disks 352. The disk sequencer 340 synchronizes read operations to signal SYNCDET. A clock signal BYTECLK has a frequency that matches the data transfer rate to or from disks 352 and varies with track radius as required for constant density recording. For example, the frequency of clock signal BYTECLK is higher for tracks with larger radii.

The servo sequencer 330 is coupled to servo mechanism 356 and controls seek, track following, and servo sector handling. Servo sectors contain identifications fields indicating track and frame numbers associated with the servo sector and magnetization patterns that servo sequencer 330 uses for track following. While processing a servo sector, servo sequencer 330 reads an identification field to determine a frame number that identifies the servo sector and the following data frame. For example, the servo sequencer 330 may assert a signal FRAME# indicating the frame number to the disk sequencer 340. The disk sequencer 340 may maintain an EOS count indicating the data frame number. The EOS count is initialized at an index pulse from servo sequencer 330 and incremented at each EOS pulse.

The disk sequencer 340 includes a format calculator 342 and a disk control logic 344. The format calculator 342 calculates frame parameters indicating the format of a data frame from a frame number. The data frame number may be identified from servo wedges on the disks. In addition, the format calculator 342 may also use static parameters written to the disk sequencer 340 during system initialization and zone parameters written to disk sequencer 340 during a seek to a zone. At an EOS pulse, the disk control logic 344 uses frame parameters to identify beginnings and splits for data sector in data frame following the servo sector.

From the frame number, the format calculator 342 determines frame parameters that indicate the locations of sector starts and splits in the following frame. Where the format calculator 342 receives the frame number during handling of a servo sector, for example, it computes the frame parameters before the EOS pulse marking the start of a data frame. Where the format calculator 342 uses an EOS count that is incremented at EOS pulses, it computes the frame parameters for the next frame based on the EOS count for the previous frame so that the frame parameters are available before the EOS pulse marking the start of the next data frame.

In one embodiment, two words of zone parameters are provided per zone. Hence, transfer of format information between a data buffer 320 or a system microprocessor 310 and disk sequencer 340 uses very little bandwidth. Furthermore, the format calculation for a data frame is fast enough that the format calculation is completed during servo sector handling so that frame parameters are available when required at the next EOS pulse.

The format calculator 342 converts servo frame numbers to associated sector numbers on track. The conversion of servo frame number to sector number is preferably performed when a zone change or head switch occurs. The conversion is completed within a specified time, which is preferably the time to traverse and read one servo wedge. After obtaining the sector number, the subsequent sector number on track is incremented whenever the sector mark is encountered until the last sector on track before the first servo frame. In one embodiment, the physical sector number associated with the servo frame number is calculated on-the-fly. In this manner, processor bandwidth consumption is reduced while supporting zero latency read/write operations.

In accordance with a preferred embodiment, a servo frame number (i.e., EOS number) is provided for each servo sample. The servo frame number is increased by one when each servo sample is validated. In addition, a seek operation takes at least one servo sample before any disk read or disk write operation can start.

During a head switch or zone change, the format calculator 342 is provided with track format information as well as the frame parameters. Frame parameters are described in ample detail in U.S. Pat. No. 5,959,795 by Joanne C. Wu and entitled "Format Calculator for Headerless Hard Disk with Embedded Servo Wedges," which is incorporated herein by reference. One of the track format information provided to the format calculator 342 is the size of the required track information, which is n bits per zone, where n is the total number of data frames or servo frames per track. Only one bit is required for each data frame because the number of whole sectors in each data frame is either the same as the first data frame or one less. If k is the number of whole sectors in the first data frame, then the number of whole sectors in the rest of the data frame is either k or (k−1). For a disk drive with 64 servo frames, for example, 64 bits or 8 bytes are provided for sector-number-on-track conversion at zone change or head switch.

In one embodiment, the format calculator 342 uses a table to store the information needed for conversion. The size of the table is defined by the number of zones and the number of servo wedges per track. For example, a disk drive having 20 zones per head and 64 servo frames per track would require a table of 160 bytes for storing the track information for the disk drive.

Given that the first servo frame number is initialized to 1 and the subsequent servo frame number is incremented by 1 each time a servo sample is validated, it is observed that the first servo frame does not need to be the first frame after the index. The sector-number-on-track is initialized to 0 and sector 0 is the sector following servo frame 1. The sector number is incremented by 1 each time a sector mark is generated. In accordance with one embodiment, the sector number of the first unsplit sector folowing servo frame f is given by the following equation:

$$s = (f-1)(k+1) - \sum_{i=1}^{f-1} b_i - \left[\frac{f-1}{x}\right] \quad \text{Equation (1)}$$

where s=sector number of first unsplit sector following servo frame f;
  k=number of whole sectors in frame 1;
  f=servo frame number, greater than 1;
  b=frame information bit corresponding to frame i; and
  x=smallest frame number for which the ending partial sector size is zero.

In implementing Equation (1), it should be noted that when servo wedge offset is present among disk heads, the servo frame number f is the offset version of the raw servo frame number from servo system. The frame information bit $b_i$ is equal to 0 if the number of whole sectors in frame i is equal to k. However, if the number of whole sectors in frame i is equal to k−1, then the frame information bit $b_i$ is equal to 1.

Figure 4:
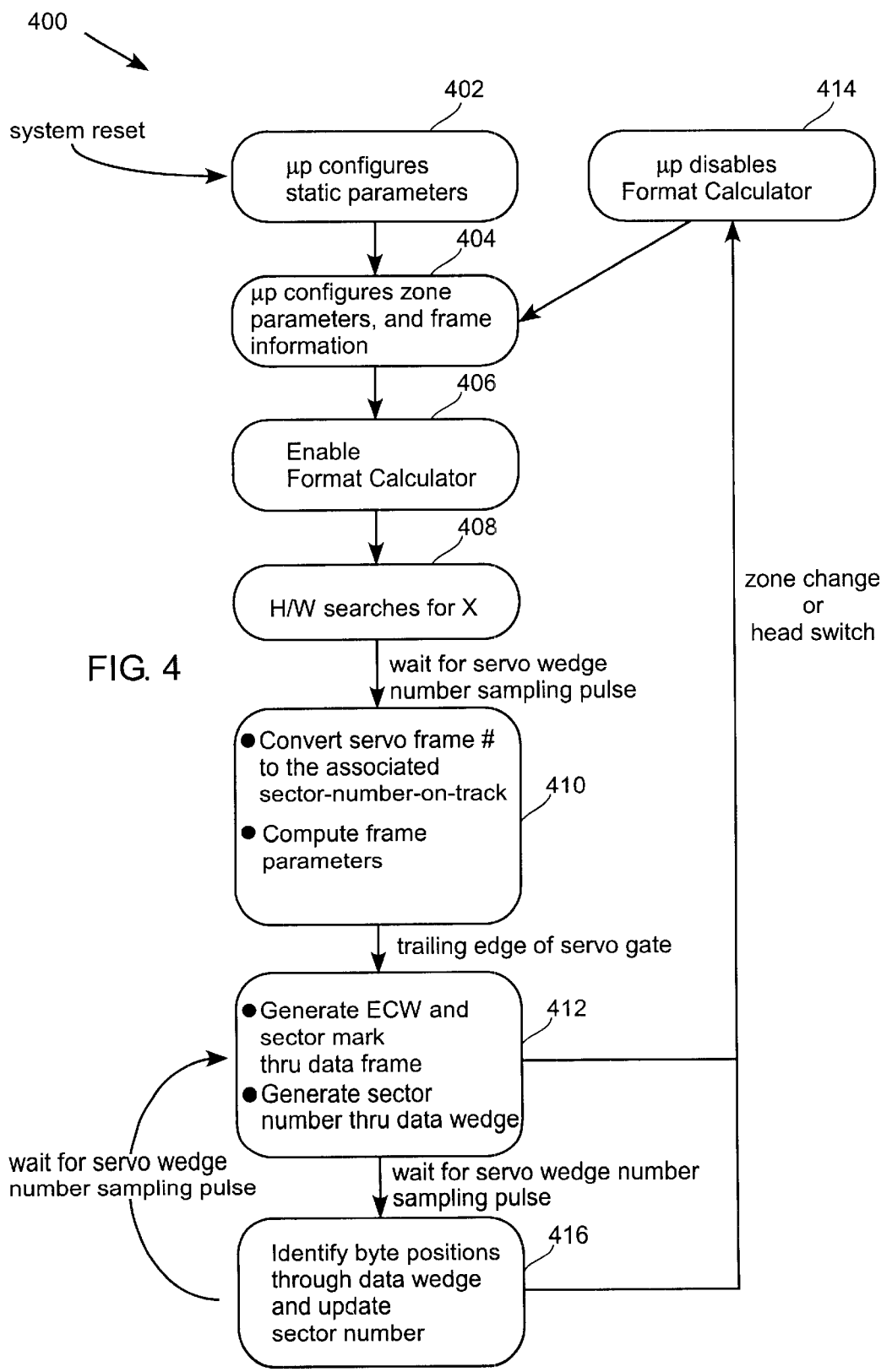
FIG. 4 is a flow chart of a method for converting servo frame numbers to associated sector numbers on track in accordance with one embodiment of the present invention.

FIG. 4 shows a flow chart of a method for operating the headerless hard disk drive 300 in accordance with one embodiment of the present invention. Initially, in operation 402, upon system reset or startup, the microprocessor 310 writes static parameters including maximum frame number MAXFRAME and counts PLOCNT, TFCNT, SBCNT, BPS, and PADCNT to configuration registers in disk sequencer 340. The static parameters PLOCNT, TFCNT, SBCNT, BPS, and PADCNT indicate the sizes of phase lock fields, training fields, sync byte fields, data fields for full data sectors, and pad fields, respectively. The static parameters are valid for all tracks on disks 352 and are written during initialization operation 402. Counts BGS and MGS may be either static or variable parameters depending on whether they vary from zone to zone.

After initialization, the microprocessor 310 configures zone parameters and frame information, in operation 404, by identifying a target zone containing a data sector to be accessed and transferring zone parameters for the target zone to the disk sequencer 340. Alternatively, zone parameters may be stored in data buffer 320 or non-volatile memory and retrieved directly from memory by the disk sequencer 340. The zone parameters may include a 5-bit byte count BGS indicating the size of the inter-sector gap 205, a 5-bit sector counter indicating the number of full data sectors in the first data frame, and a 10-bit byte count indicating the number of bytes in the data field of an ending partial data sector of the first data frame. In addition, the zone parameters may also include the following parameters: starting logical block address (LBA), starting cylinder, number of cylinders, number of sectors per track, track skew, cylinder skew, and offsets to beginning of various zone tables. The zone parameters may be stored in data buffer 320 during initialization or in a non-volatile memory. Because only two words of zone parameters are required per zone, the memory capacity required is considerably less than that required to store track format tables in conventional headerless hard disk drive systems.

Upon configuring the zone parameters and frame information, the microprocessor 310 enables the format calculator 342 in operation 406. Then in operation 408, the format calculator 342 searches for a repeat value X that is the smallest integer satisfying equation, $(X*E1)$ modulo $(OVH+BPS+MSG)>=BPS$, and is less than or equal to maximum frame number MAXFRAME. If the repeat value X is less than a maximum frame number MAXFRAME for a track, frame X does not have an ending partial data sector and frame X+1 has the same format as frame 1. In general, the formats of data frames following data frame X+1 are the same as the formats for the frames following data frame 1. Hence, the format of track j is same as the format for track (j modulo X). The search operation 406 along with the equation and its parameters is described in more detail in the previously incorporated U.S. Pat. No. 5,959,795.

Once repeat value X has been found, the format calculator 342 waits for a sampling pulse (e.g., EOS pulse) indicating a servo wedge number in a signal SAMPLE from the servo sequencer 330. The format calculator 342 converts a frame number signal FRAME# from the servo sequencer 330 to the associated sector-number-on-track using equation (1). The computed sector-number-on-track, which is the sector number corresponding to current servo wedge, is the first sector number on track. In addition to the sector-number-on-track, the format calculator 342 computes frame parameters Ej, Bj, and NSj, which correspond to ending split sector size in byte, beginning split sector size in bytes, and number of whole sectors in the data wedge, respectively. The calculation of the frame parameters Ej, Bj, and NSj is described in detail in the previously referenced U.S. Pat. No. 5,959, 795.

The format calculator 342 completes the calculation of the sector-number-on-track and frame parameters before the servo sequencer 330 finishes processing the servo sector. At the trailing edge of servo gate,)the format calculator 342 may generate ECW and sector mark through data frame, (i.e., data wedge) in operation 412. The ECW indicates the start of data frame and ending gap and where each field starts at data wedge. In addition, the format calculator 342 may generate sector number through data wedge in operation 412 using equation (1). After waiting for servo wedge number sample pulse (e.g., EOS pulse), in operation 416, the format calculator 342 identifies byte positions through the data wedge and updates sector number by incrementing the index i of equation (1). For byte position identification, for example, the format calculator 342 identifies data sector starts and splits in frame j using the frame parameters Ej, Bj, and NSj.

Whenever a zone change or head switch occurs upon completion of operation 412 or 416, the method proceeds back to operation 404, where zone parameters and frame information are reconfigured after the format calculator 342 has been disabled in operation 414. After identifying byte positions and updating sector numbers, the format calculator 342 waits for wedge number sample pulse (e.g., EOS pulse). When the wedge number sample pulse is detected, the method proceeds back to operation 412, where the format calculator 342 generates ECW, sector mark, and sector number.

Figure 5:
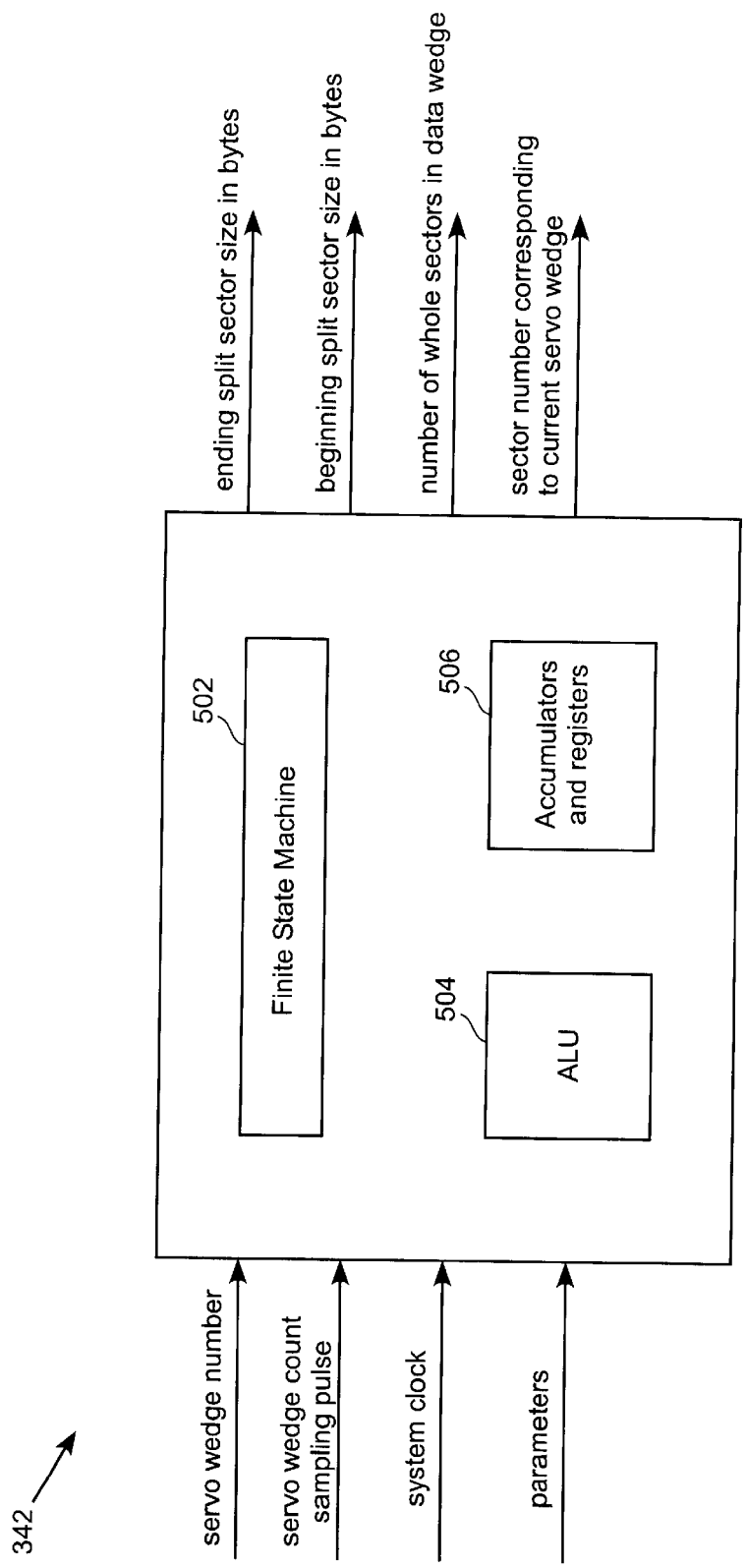
FIG. 5 shows a more detailed block diagram of the format calculator in accordance with one embodiment of the present invention.

FIG. 5 shows a more detailed block diagram of the format calculator 342 in accordance with one embodiment of the present invention. The format calculator 342 includes a finite state machine 502, an arithmetic and logic unit (ALU) 504, and accumulators and registers 506. The format calculator 342 receives servo wedge number, servo wedge count sampling pulse (e.g., EOS pulse), system clock, and parameters including zone parameters, static parameters, and track information. The accumulators and registers 506 are used to store static parameters, frame number, zone parameters, frame parameters, and variables used in the repeat value search and calculation of the frame parameters and sector-number-on-track. The ALU 504 under the control of the finite state machine 502 performs arithmetic operations needed for searching the repeat value and performing frame parameter calculations and servo frame number conversion. As outputs, the format calculator 342 generates ending split sector size in bytes (Ej), beginning split sector size in bytes (Bj), number of whole sectors in data wedge (NSj), and sector number corresponding to the current servo wedge.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A headerless hard disk drive system comprising:
   a head-disk assembly including a set of recordable disks for storing data, each recordable disk having a plurality of tracks, each track having a plurality of servo wedges for dividing the track into a plurality of data frames, one data frame being associated with one servo wedge, wherein the tracks do not contain any header information that uniquely identifies the data frames in the tracks;
   a servo control logic coupled to the head-disk assembly to process the servo wedges for generating a signal that identifies a servo wedge being processed on a track; and a format calculator for converting the signal that identifies the servo wedge being processed to an associated sector number on the track, the format calculator being adapted to compute a set of parameters including ending and beginning split sector sizes and the number of whole sectors in the data frame associated with the servo wedge being processed.

2. The headerless hard disk drive system as recited in claim 1, further comprising:
a disk control logic coupled to the format calculator for controlling data transfers to and from the set of recordable disks by using the associated sector number that correspond to the servo wedge being processed and the set of parameters.

3. The headerless hard disk drive system as recited in claim 1, wherein the format calculator converts the servo wedge identifying signal to the associated sector number by using an equation, $$s = (f-1)(k+1) - \sum_{i=1}^{f-1} b_i - \left[\frac{f-1}{x}\right],$$

where s is a sector number of a first unsplit sector following servo frame f; k is a number of whole sectors in frame 1; f is a servo frame number that is greater than 1; $b_i$ is a frame information bit corresponding to frame i; and x is a smallest frame number for which the ending partial sector size is zero.

4. The headerless hard disk drive system as recited in claim 1, wherein the format calculator generates sector numbers and sector marks throughout the data frame associated with the servo wedge being processed.

5. The headerless hard disk drive system as recited in claim 1, wherein the format calculator converts the servo wedge identifying signal to the associated sector number when zone change or head switch occurs in the head-disk assembly.

6. The headerless hard disk drive system as recited in claim 1, wherein the servo wedge identifying signal is converted to the associated sector number within one servo wedge time.

7. The headerless hard disk drive system as recited in claim 1, wherein, after obtaining the associated sector number, the form at calculator increments the sector number when a sector mark is encountered until the last sector on track before the first servo frame.

8. The headerless hard disk drive system as recited in claim 1, wherein the format calculator identifies byte positions through the data frame and updates the sector number.

9. A disk sequencer for a headerless hard drive system, the headerless disk drive system including a head-disk assembly having a set of hard disks for storing data, each hard disk having a plurality of tracks, each track having a plurality of servo wedges for dividing the track into a plurality of data frames, one data frame being associated with one servo wedge, wherein the tracks do not contain any header information that uniquely identifies the data frames in the tracks, the disk sequencer comprising:
a format calculator for converting a signal that identifies a servo wedge being processed in a track to an associated sector number in the track, the format calculator being adapted to compute a set of parameters including ending and beginning split sector sizes and the number of whole sectors in the data frame associated with the servo wedge being processed; and
a disk control logic coupled to the format calculator for controlling data transfers to and from the set of hard disks by using the associated sector number that correspond to the servo wedge being processed and the set of parameters.

10. The disk sequencer as recited in claim 9, wherein the format calculator converts the servo wedge identifying signal to the associated sector number by using an equation, $$s = (f-1)(k+1) - \sum_{i=1}^{f-1} b_i - \left[\frac{f-1}{x}\right],$$

where s is a sector number of a first unsplit sector following servo frame f; k is a number of whole sectors in frame 1; f is a servo frame number that is greater than 1; $b_i$ is a frame information bit corresponding to frame i; and x is a smallest frame number for which the ending partial sector size is zero.

11. The disk sequencer as recited in claim 9, wherein the format calculator generates sector numbers and sector marks throughout the data frame associated with the servo wedge being processed.

12. The disk sequencer as recited in claim 9, wherein the format calculator converts the servo wedge identifying signal to the associated sector number when zone change or head switch occurs in the head-disk assembly.

13. The disk sequencer as recited in claim 9, wherein the servo wedge identifying signal is converted to the associated sector number within one servo wedge time.

14. The disk sequencer as recited in claim 9, wherein, after obtaining the associated sector number, the format calculator increments the sector number when a sector mark is encountered until the last sector on track before the first servo frame.

15. The headerless hard disk drive system as recited in claim 9, wherein the format calculator identifies byte positions through the data frame and updates the sector number.

16. A hard drive system comprising:
a head-disk assembly including a set of hard disks for storing data, each hard disk having a plurality of tracks, each track having a plurality of servo wedges for dividing the track into a plurality of data frames, one data frame being associated with one servo wedge, wherein the tracks do not contain any header information that uniquely identifies the data frames in the tracks;
a servo control logic coupled to the head-disk assembly to process the servo wedges for generating a signal that identifies a servo wedge being processed in a track; and
a format calculator adapted to convert the servo wedge identifying signal to an associated sector number that corresponds to the servo wedge being processed in the track, the format calculator being adapted to compute a set of parameters including ending and beginning split sector sizes and the number of whole sectors in the data frame associated with the servo wedge being processed.

17. The hard drive system as recited in claim 16, further comprising:
a disk control logic coupled to the format calculator for controlling data transfers to and from the set of hard disks by using the associated sector number that correspond to the servo wedge being processed and the set of parameters.

18. The hard drive system as recited in claim 16, wherein the format calculator converts the servo wedge identifying signal to the associated sector number by using an equation, $$s = (f-1)(k+1) - \sum_{i=1}^{f-1} b_i - \left[\frac{f-1}{x}\right],$$

where s is a sector number of a first unsplit sector following servo frame f; k is a number of whole sectors in frame 1; f is a servo frame number that is greater than 1; $b_i$ is a frame information bit corresponding to frame i; and x is a smallest frame number for which the ending partial sector size is zero.

19. The hard drive system as recited in claim 16, wherein the format calculator generates sector numbers and sector marks throughout the data frame associated with the servo wedge being processed.

20. The hard drive system as recited in claim 16, wherein the format calculator converts the servo wedge identifying signal to the associated sector number when zone change or head switch occurs in the head-disk assembly.

21. The hard drive system as recited in claim 16, wherein, after obtaining the associated sector number, the format calculator increments the sector number when a sector mark is encountered until the last sector on track before the first servo frame.

* * * * *